United States Patent [19]

Marecot et al.

[11] Patent Number: 5,413,984
[45] Date of Patent: May 9, 1995

[54] METHOD FOR PREPARING MULTI-METAL CATALYSTS

[75] Inventors: Patrice Marecot, St. Georges les Baillargeaux; Jacques Barbier, Chasseneuil du Poitu; Gil Mabilon, Carrieres S/Seine; Daniel Durand; Michel Prigent, both of Rueil Malmaison, all of France

[73] Assignee: Institut Français du Petrole, Rueil Malmaison, France

[21] Appl. No.: 934,515

[22] PCT Filed: Dec. 4, 1991

[86] PCT No.: PCT/FR91/00969

§ 371 Date: Oct. 13, 1992

§ 102(e) Date: Oct. 13, 1992

[87] PCT Pub. No.: WO92/11086

PCT Pub. Date: Jul. 9, 1992

[51] Int. Cl.⁶ .............................. B01J 23/44
[52] U.S. Cl. ........................ 502/333; 423/213.5; 502/334; 502/339
[58] Field of Search ............ 502/333, 334, 339, 262; 423/213.5

[56] References Cited

U.S. PATENT DOCUMENTS

| | | | |
|---|---|---|---|
| 3,224,981 | 12/1965 | Stephens et al. | 252/460 |
| 3,567,625 | 3/1971 | Sinfelt et al. | 208/138 |
| 4,492,769 | 1/1985 | Buanchard et al. | 502/262 |
| 4,621,071 | 11/1986 | Blanchard et al. | 502/262 |
| 4,920,088 | 4/1990 | Kolts | 502/326 |
| 4,931,419 | 6/1990 | Blanchard et al. | 502/339 X |
| 5,041,407 | 8/1991 | Williamson et al. | 423/213.5 X |
| 5,185,305 | 2/1993 | Subramanian et al. | 423/213.5 X |

*Primary Examiner*—Asok Pal

[57] ABSTRACT

A method for preparing multi-metal catalysts including an active phase consisting of at least two metals, A and B, which are selected from groups VIII and IB of the periodic table, and a porous support. According to the method: firstly, at least a part of the porous support is impregnated with at least one precursor of metal A; secondly, activation is performed in a neutral or oxidizing atmosphere at a temperature of 120°–800° C. whereafter a treatment is carried out in a reduction medium at a temperature of 0°–800° C.; thirdly, at least a part of the support which was previously impregnated with the precursor of metal A is impregnated with at least one precursor of metal B; and fourthly, activation is performed in a neutral or oxidizing atmosphere at a temperature of 120°–800° C. The catalysts thereby obtained have improved stability, particularly when subjected to high temperatures, such as when they are used as post-combustion catalysts for exhaust gases from internal combustion engines, in which case metal A is platinum or palladium and metal B is platinum, palladium or rhodium, with the proviso that B is not the same as A.

21 Claims, 2 Drawing Sheets

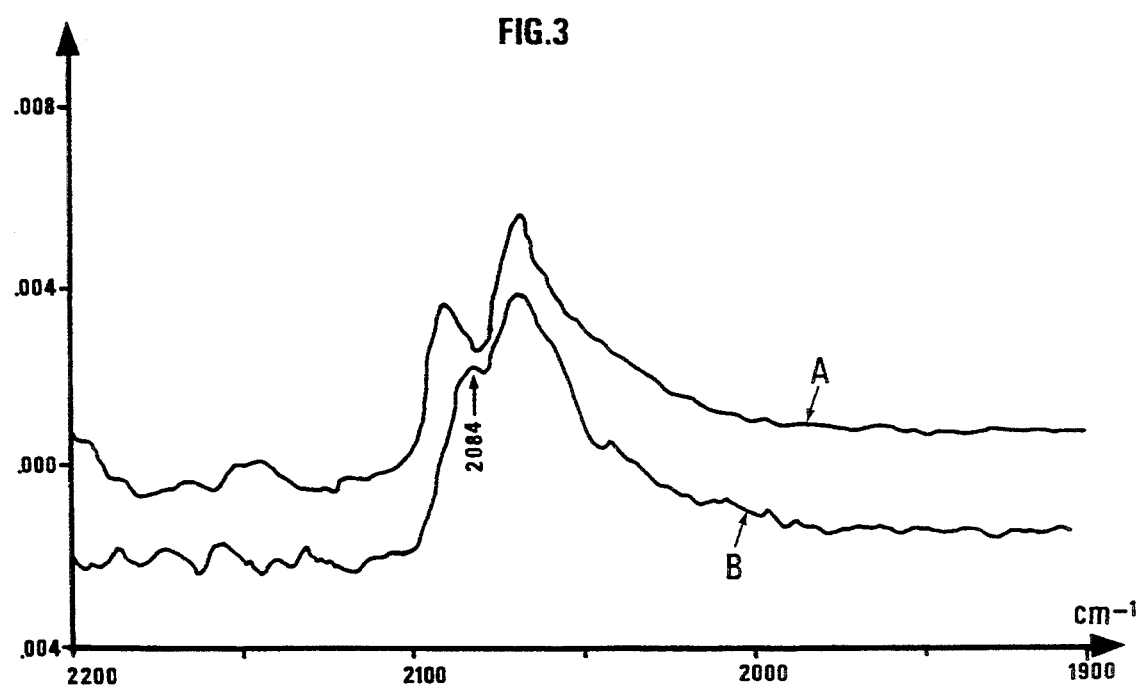

METHOD FOR PREPARING MULTI-METAL CATALYSTS

BACKGROUND OF THE INVENTION

The invention concerns a method of preparing multimetal catalysts.

Multimetal catalysts are frequently used in refining, petrol chemistry, fine chemistry and catalytic combustion and post-combustion, in order to accelerate chemical reactions. They normally have the advantage over monometallic catalysts of being more selective; this is illustrated in Hydrocarbon Technology, 1990, 12, 20–43, by the improvement in selectivity in the formation of toluene during catalytic reforming of n-heptane on a catalyst based on platinum and iridium, compared with the same reaction on a catalyst based on platinum only. In catalytic combustion or post-combustion, catalysts based on platinum and palladium or based on platinum and rhodium are preferred to catalysts based on platinum only, since they broaden the range of operating conditions under which the catalysts can be used.

For metal catalysts to have good catalytic activity, the metal particles must be in a highly divided state. The principle which is most widely applied to obtain this state is deposition of the metals on a porous carrier. Porous carriers have a large specific surface area, on which the metals can be deposited in the form of very small particles. Multimetal catalysts are obtained on the same principle.

The porous carriers used are selected according to their texture, resistance to high-temperature fritting and chemical properties. Those most commonly used are aluminas, silica, silica-aluminas, zeolites, oxides of titanium, cerium, chromium or zirconium, mixed oxides of aluminium and magnesium or aluminium and nickel, carbides, nitrides, borides and activated carbons. Porous carriers may be impregnated with metals by several methods which are well known in the art. Ch. Marcilly and J. P. Franck have drawn up a list of such methods (Revue Institut Francais du Pétrole, 1984, 3, 337–364). The most frequently used are impregnation by exchange and dry impregnation. The first method exploits the cation or anion exchange properties of porous carriers. It comprises dipping the porous carrier in an aqueous or organic solution of metal precursors with a controlled pH. The ionic metal precursors in solution are exchanged with surface locations of the carrier. The second method comprises preparing an aqueous or organic solution of metal precursors and impregnating the porous carrier with a volume of solution equal to its pore volume.

These techniques can be applied not only to the preparation of monometallic catalysts but also to the preparation of multimetal ones. In the latter case the solutions of metal precursors simultaneously contain the precursors of the various metals with which the carrier is to be impregnated. The technique is then described as the co-impregnation method.

SUMMARY OF THE INVENTION

In seeking to improve the catalytic properties of multimetal catalysts, Applicants have found that catalysts can be prepared by a method comprising two impregnation stages, and further comprising at least one treatment in a reducing medium after the first impregnation stage. This method increases the stability of catalytic performance.

The invention thus concerns a method of preparing multimetal catalysts in which the active phase comprises at least two metals A and B belonging to Groups VIII and IB of the Periodic Table, deposited on a porous carrier, characterised in that:

- at a first stage, at least part of the porous carrier is impregnated with at least one precursor of metal A:
- at a second stage, activation is carried out in a neutral or oxidizing atmosphere at a temperature from 120° to 800° C., followed by activation in a reducing medium at a temperature from 0° to 800° C.;
- at a third stage, at least part of the carrier which is already at least partly impregnated with the precursor of metal A is impregnated with at least one precursor of metal B; and
- at a fourth stage, activation is carried out in a neutral or oxidizing atmosphere at a temperature of 120° to 800° C., possibly followed by activation in a reducing medium at 0° to 800° C.

In preparing catalysts by the method of the invention, the porous carrier may be selected according to the application envisaged, from the group mentioned above. Some examples of the aluminas are ro, gamma, eta, delta, theta, kappa and alpha alumina and mixtures thereof. The texture of these aluminas may be made more stable by adding certain elements, such as the elements of lanthanides, particularly lanthanum, neodymium or cerium, alkali metals such as potassium, alkaline earth metals such as magnesium or barium, transition metals such as titanium or zirconium, or elements from Groups IIIA or IVA of the Periodic Table, such as gallium or silicon. These elements may be added either pure or mixed. Pure aluminas or aluminas modified by stabilisers are widely used as carriers for hydrogenation, dehydrogenation or reforming catalysts in refining and petrochemical processes. They are also used as carriers for combustion or post-combustion catalysts. In this case they are frequently combined with other porous carriers such as cerium oxide, zirconium oxide, lanthanum oxide or neodymium oxide and mixtures thereof, and with the mixed oxides obtained by combining these.

Other porous carriers are known in the art, for example zeolites, silica-aluminas, clays, silica, titanium or zirconium oxides, mixed oxides such as 1 anthanum aluminate, barium aluminate or magnesium aluminate, carbides such as tungsten carbide, silicon carbide or titanium carbide, nitrides such as silicon nitride or titaniumnitride, activated carbons and mixtures thereof; these carriers may be suitable for catalysts designed for reactions in refining, petrol chemistry, fine chemistry and catalytic combustion and post-combustion.

All these porous carriers may be used either pure or mixed.

In the method of the invention the porous carrier may be in the form of a powder, spheres or small rods obtained, for example, by extrusion or pelleting. Porous carriers formed by one or more oxides covering a ceramic or metallic substrate may equally be used. The substrate may be in the form of a ceramic honeycomb structure containing passages. The main material may be cordierite, mullite, alumina, zirconia, barium titanate, silicon carbide or silicon nitride. The porous carrier may advantageously be deposited on the substrate by the method described in French Patent 2,512,004; the median diameter of the powders used generally being from 1 to 100 microns, more particularly from 2 to 50 microns. The substrate may alternatively be formed by a pile of fibres or a roll of strips of metal alloys. The metal alloys must have refractory properties. They may, for example, be made up of iron, chromium, aluminium and cerium or yttrium, such as Gilphal 135 steel produced by Imphy. The porous carrier may again be deposited on these metal substrates by the method described in French Patent 2 512 004. In this case, in a preferred embodiment of the method, the substrate is previously subjected to oxidising treatment at a temperature from 700° to 1200° C, preferably from 800° to 1000° C.

In the method of the invention, when the porous carrier is deposited on a ceramic or metallic substrate, impregnation with precursors of the metals A and B may take place before the deposition of the porous carrier on the substrate, or after such deposition, or impregnation with the precursor of metal A may take place before deposition and impregnation with the precursor of metal B after deposition.

The metals from Groups VIII and IB of the Periodic Table are iron, cobalt, nickel, ruthenium, rhodium, palladium, osmium, iridium, platinum, copper, silver and gold.

The precursors of metals from Groups VIII and IB which are suitable for use in the method of the invention are compounds which are soluble in an inorganic, particularly an aqueous medium, or an organic medium. Some nonrestrictive examples are chlorides such as ferrous chloride, ferric chloride, rhodium chloride, palladium chloride, iridium dichloride, iridium tetrachloride or ruthenium chloride, chlorinated acids such as chloroplatinic acid or chloroiridic acid, non-chlorinated acids such as hydroxyplatinic acid, nitrates such as nickel nitrate, rhodium nitrate or palladium nitrate, nitroso complexes such as dinitroso-diamminoplatinum or dinitroso-diamminopalladium, ammino complexes such as nickel hexamminochloride, palladium tetramminonitrate or chloro-rhodium pentamminochloride, salts of carboxylic acids such as palladium acetate, and organometallic complexes such as palladium acetylacetonate or rhodium acetylacetonate.

In a first stage of the method of the invention, the precursor of the metal A is dissolved in an appropriate organic or inorganic solvent. All or part of the porous carrier is impregnated with the solution thus prepared. It may be impregnated with a volume of solution ranging from one-tenth of the pore volume of the carrier to one hundred times that volume, and preferably from one-fifth to ten times that volume. A person skilled in the art will adapt the process to the morphology of the porous carrier, according to whether it is in the form of a powder, spheres or small rods obtained by extrusion or pelleting, or a thin layer on the surface of a monolithic ceramic or metal substrate.

The concentration of precursor of metal A in the solution is chosen so that, when the four stages of the process are over, the concentration of metal A in the multimetal catalyst, expressed by weight relative to the porous carrier, will be from 10 ppm to 10% and preferably from 50 ppm to 2%.

The solution of precursor of metal A may, if necessary, contain hydrogen, ammoniuim, chloride, nitrate or other ions, designed to change the acidity/basicity conditions of the medium and/or to change the number of exchange locations on the porous carrier.

The temperature at which the carrier is impregnated with the precursor of metal A is generally from 0° to 100° C., preferably from 10° to 40° C. The impregnation time is generally from 1 minute to 10 hours, preferably from 2 minutes to 4 hours.

In a second stage of the method of the invention, the porous carrier is heat-activated at a temperature from 120° to 800° C. The treatment takes place in a neutral or oxidising atmosphere which may, for example, comprise nitrogen, argon, air, oxygen, combustion gases from mixtures of air and hydrocarbons at a concentration of 1:1 or less, and mixtures thereof. The treatment generally takes from 30 minutes to 30 hours, preferably from 1 to 6 hours. This second stage is followed by treatment in a reducing medium at a temperature from 0° to 800° C. The reducing medium contains pure compounds or mixtures of compounds such as hydrogen, carbon monoxide, saturated or unsaturated aliphatic or aromatic hydrocarbons such as methane, ethane, propane, butane, ethylene, propylene, acetylene, benzene or toluene, carboxylic acids such as formic acid or acetic acid, aldehydes such as formaldehyde or acetaldehyde, alcohols such as methanol, ethanol or propanol, polyols such as ethylene glycol or propylene glycol, amines such as methylamine or ethylamine, urea, isocyanic acid, hydroxylamine, hydrazine or combustion gases from a mixture of air and hydrocarbons at a concentration higher than 1:1. In practice these reducing compounds may be mixed with inert compounds such as nitrogen or argon, which do not change the reducing character of the compounds mentioned above. The treatment generally takes from 30 minutes to 30 hours, preferably 1 to 6 hours.

In a preferred embodiment of the method of the invention, at the third stage, the heat treatment in a reducing medium at 0°–800° C. is followed by treatment with at least one hydrogen donor compound at a temperature below 200° C. By way of example, the hydrogen donor compounds may be selected from hydrogen, ammonia, saturated or unsaturated aliphatic hydrocarbons and aromatic hydrocarbons.

At a third stage of the method of the invention, the part of the porous carrier which is impregnated with the precursor of metal A is impregnated with the precursor of metal B, in a manner similar to its impregnation with the precursor of metal A.

As in impregnation with the precursor of metal A, the volume of solution may be from one-tenth to one hundred times the pore volume of the carrier, and preferably from one-fifth to ten times that volume.

The concentration of precursor of metal B in the solution is chosen so that, when the fourth stage of preparation is over, the concentration of metal B in the multimetal catalyst, expressed by weight relative to the porous carrier, will be from 10 ppm to 10%, preferably from 50 ppm to 2%.

The solution of precursor of metal B may, if necessary, contain hydrogen, ammonium, chloride, nitrate or other ions.

The temperature at which the carrier is impregnated with precursor of metal B is generally from 0° to 100° C. and preferably from 10° to 40° C. Impregnation generally takes from 1 minute to 10 hours.

Impregnation with the precursor of metal B takes place in a neutral, oxidizing or reducing atmosphere.

In cases where activation of the second stage has been followed by treatment with a hydrogen donor compound at a temperature below 200° C., impregnation with the precursor of metal B may take place either in the same atmosphere of hydrogen donor compound or in a neutral atmosphere containing, for example, nitrogen, argon or mixtures thereof.

In a fourth stage of the method of the invention, the porous carrier impregnated with precursors of metals A and B is activated in a neutral or oxidising atmosphere at a temperature from 120° to 800° C. This may possibly be followed by activation in a reducing medium at a temperature from 0° to 800° C.

The method of preparing multi-metal catalysts as described above may be applied to the preparation of various bimetallic catalysts, for example those used particularly for catalysis in selective hydrogenation of acetylene compounds and diolefins to mono-olefins (the metal pairs being inter alia palladium-platinum, palladium-rhodium, palladium-silver, palladium-gold or palladium-nickel), catalytic reforming of naphtha cuts and dehydrogenation of paraffins to olefins (the metal pairs being inter alia platinum-iridium or platinum-rhodium), combustion of hydrocarbons in air, particularly to produce energy in turbine engines (the metal pairs being inter alia platinum-palladium, platinum-rhodium platinum-cobalt), or for catalysis in the conversion of pollutants in exhaust fumes from internal combustion engines, the exhaust fumes particularly containing carbon monoxide, unburnt hydrocarbons, nitrogen oxides and soot.

In catalysts which are used in this last instance, the metal A is more particularly platinum or palladium and the metal B is different from the metal A and is more particularly platinum, palladium or rhodium.

Catalysts obtained by the method of the invention differ from prior art catalysts in having improved stability, particularly when they are liable to operate at a high temperature.

The improvement in the stability of catalytic performance is demonstrated by comparative tests between catalysts prepared in accordance with the invention and those prepared as in prior art, in which they are subjected to severe heat treatment conditions. In addition, the activity of metal catalysts generally depends on the divided state of the metals. This divided state, known as dispersion, can be characterised by chemisorption techniques. For example, chemisorption of carbon monoxide or hydrogen, or titration of chemisorbed hydrogen with oxygen, may be used to characterise the dispersion of the metals. Catalysts prepared by the method of the invention are characterised by having a larger quantity of chemisorbed carbon monoxide after severe heat treatment.

Thus for catalysts where the metal A is platinum and the metal B is rhodium, for example, dispersion of these metals can be demonstrated e.g. by chemisorption of carbon monoxide; it is indicated in infra-red spectra by a characteristic band at approximately 2084 $cm^{-1}$.

Multi-metal catalysts prepared by the method of the invention can also be distinguished from the catalysts with which they are compared by modification of interaction between metals.

This may be demonstrated by curves plotting reduction of the catalysts at a programmed temperature, in hydrogen or carbon monoxide, or by the infra-red absorption frequencies of the carbon monoxide-chemisorbed on the catalysts.

Curves plotting reduction of catalysts prepared by co-impregnation with metals at a programmed temperature generally have one peak only, corresponding to the simultaneous reduction of both metals. In the case of a catalyst where the metals are platinum and rhodium, the maximum for the peak is obtained by a temperature of about 210° C. For catalysts prepared by the method of the invention the reduction curve has two peaks. They are obtained for temperatures of about 200° and 260° C. for a catalyst where the metal A is platinum and the metal B rhodium.

These characteristics may enable a catalyst based on platinum and rhodium and prepared by the method of the invention to be distinguished from a catalyst containing the same metals but obtained by a different process such as co-impregnation.

The following examples illustrate the invention without restricting its scope. Examples 1, 3, 7 and 8 are given as a comparison.

EXAMPLES

EXAMPLE 1 (COMPARATIVE)

Preparation of a platinum-palladium catalyst by co-impregnation 100 g of a Rhône-Poulenc alumina in spheres, with a specific surface area of 110 m2/g and a pore volume of 1.10 cm3/g, is placed in a 1 l Erlenmeyer flask. 110 ml of a solution of chloroplatinic acid and palladium chloride is prepared, containing 1 g of platinum and 0.5 g of palladium. The solution is poured over the alumina spheres for 20 minutes, with the Erlenmeyer flask kept agitated. The spheres are placed in a stove at 120° C. for 2 hours. They are then put into an oven in air; the oven temperature is programmed to rise from 120° to 500° C. in 2 hours, then to stay at 500° C. for 2 hours.

The catalyst (I) thus obtained contains 1% of platinum and 0.5% of palladium, by weight relative to the carrier.

EXAMPLE 2

Preparation of a platinum-palladium catalyst (II) according to the invention

As in Example 1, 100 g of a Rhône-Poulenc alumina in spheres, with a specific surface area of 110 m2/g and a pore volume of 1.10 cm3/g, is placed in a 1 l Erlenmeyer flask in a first stage. 110 ml of a solution of chloroplatinic acid is prepared, containing 1 g of platinum. The solution is poured over the alumina spheres for 20 minutes, with the Erlenmeyer flask kept agitated. In a second stage the spheres are placed in a stove at 120° C. for 2 hours. When this treatment is over they are placed in air in an oven and undergo a rise in temperature from 120° to 500° C. in 2 hours, after which they are kept at 500° C. for 2 hours. They are thereupon cooled to 40° C. The spheres are next scavenged with a reducing mixture containing 5% by volume of hydrogen in nitrogen. Their temperature is then raised to 500° C. in this gas mixture, at a rate of 3° C./minute, after which they are kept at that temperature for 2 hours. They are thereupon cooled to 25° C. in nitrogen.

In a third stage the spheres are placed in an Erlenmeyer flask in air. 110 ml of a solution of palladium chloride is prepared, containing 0.5 g of palladium. The solution is poured over the spheres in the Erlenmeyer flask, which is kept agitated.

In a fourth stage the spheres are placed in a stove at 120° C. for 2 hours, then in an oven where their temperature is raised from 120° to 500° C. in 2 hours. They are kept at 500° C. for 2 hours.

The catalyst (II) thus obtained contains 1% of platinum and 0.5% of palladium, by weight relative to the carrier.

EXAMPLE 3 (COMPARATIVE)

Preparation of a platinum-rhodium catalyst (III) by co-impregnation 1000 g of an alumina powder, with a specific surface area of 110 m2/g (median diameter of particles: 8 microns), is mixed with 200 g of cerium oxide powder, with a specific surface area of 130 m2/g (median diameter of particles: 15 microns). The mixture is added to 2800 ml of a dilute solution of nitric acid in water with a pH of 4.

The suspension thus obtained is used to coat a 904 ml cordierite monolith produced by Corning, which has a honeycomb structure with 62 passages per square centimeter. Coating is effected by dipping the monolith in the suspension, then drying it at 120° C. for 2 hours and calcining it at 500° C. for 2 hours. A second coating operation under the same conditions, followed by drying at 120° C. and calcination at 500° C., gives a deposit of porous carrier equal to 105 g of alumina and 21 g of cerium oxide on the monolithic substrate.

The resultant coated monolith is put into contact for 30 minutes with 200 ml of a solution of chloroplatinic acid and rhodium trichloride containing 1 g of platinum and 0.2 g of rhodium.

The impregnated monolith is placed in a stove at 120° C. for 3 hours and is then put into an oven, in air. Its temperature is raised to 500° C. in 2 hours then kept at that level for 2 hours.

Catalyst (III) thus prepared contains 0.794% of platinum and 0.159% of rhodium, by weight relative to the porous carrier.

EXAMPLE 4

Preparation of a palladium-rhodium catalyst (IV) according to the invention

A monolithic substrate is coated with 105 g of alumina and 21 g of cerium oxide, following the procedure described in Example 3.

At a first stage the monolith is impregnated with 200 ml of a solution of chloroplatinic acid containing 1 g of platinum.

At a second stage the impregnated monolith is placed in a stove at 120° C. for 3 hours. When this treatment is over the monolith is placed in air in an oven and undergoes a rise in temperature from 120° to 500° C. in 2 hours, after which it is kept at 500° C. for 2 hours. It is thereupon cooled to 40° C. The monolith is next scavenged with a reducing mixture containing 5% by volume of hydrogen in nitrogen. Its temperature is then raised to 500° C. in this gas mixture, at a rate of 3° C./minute, after which it is kept at that temperature for 2 hours. It is thereupon cooled to 25° C. in nitrogen, then placed in air.

In a third stage the monolith is impregnated with 200 ml of a solution of rhodium chloride containing 0.5 g of rhodium.

In a fourth stage the monolith is placed in a stove at 120° C. for 2 hours, then in an oven where its temperature is raised from 120° to 500° C. in 2 hours. It is kept at 500° C. for 2 hours.

Catalyst (IV) thus prepared contains 0.794% of platinum and 0.159% of rhodium, by weight relative to the porous carrier.

EXAMPLE 5

Preparation of a platinum-rhodium catalyst (V) according to the invention

A monolithic substrate is coated with 105 g of alumina and 21 g of cerium oxide, following the procedure described in Example 3.

At a first stage the monolith is impregnated with 200 ml of a solution of chloroplatinic acid containing 1 g of platinum.

At a second stage the impregnated monolith is placed in a stove at 120° C. for 3 hours. When this treatment is over the monolith is placed in air in an oven and undergoes a rise in temperature from 120° to 500° C. in 2 hours, after which it is kept at 500° C. for 2 hours. It is thereupon cooled to 40° C. The monolith is next scavenged with a reducing mixture containing 5% of hydrogen in nitrogen. Its temperature is then raised to 500° C. in this gas mixture in 2 hours after which it is kept at that level for 2 hours. It is thereupon cooled to 25° C. in the same atmosphere, then the hydrogen-nitrogen mixture is replaced by pure nitrogen.

In a third stage the monolith is impregnated with 200 ml of a solution of rhodium chloride containing 0.5 g of rhodium, in nitrogen.

In a fourth stage the monolith is placed in a stove at 120° C. for 2 hours, then in an oven where its temperature is raised from 120° to 500° C. in 2 hours. It is kept at 500° C. for 2 hours.

Catalyst (V) thus prepared contains 0,794% of platinum and 0,159% of rhodium, by weight relative to the porous carrier.

EXAMPLE 6

Preparation of a platinum-rhodium catalyst (VI) according to the invention 1000 g of alumina powder is mixed with 200 g of cerium oxide powder as in Example 3. In a first stage the powder is impregnated with 1100 ml of a solution of hexachloroplatinic acid containing 9.528 g of platinum.

In a second stage the powder is dried for 2 hours in a stove at 120° C., then calcined in an oven through a programmed temperature rise to 500° C. in 2 hours, followed by 2 hours' treatment at 500° C. The powder is cooled to 40° C., then placed in an atmosphere of 5% hydrogen in nitrogen. The temperature of the powder is raised to 500° C. at 3° C./minute, then kept at that level for 2 hours. The powder is cooled to 25° C. then placed in air.

In a third stage the powder is impregnated with 1100 ml of a solution of rhodium trichloride containing 1.906 g of rhodium, in air.

In a fourth stage the powder is dried in a stove at 120° C. for 2 hours. It is then placed in an oven and calcined in air, through a temperature rise to 500° C. in 2 hours, followed by 2 hours' treatment at 500° C.

The powder is then suspended in 2800 ml of an aqueous solution of nitric acid at pH 4. The suspension is used to coat a cordierite monolith produced by Corning, containing 62 passages per square centimetre. The mass of porous carrier deposited, excluding the platinum and rhodium, is 126 g.

Catalyst (VI) thus prepared contains 0.794% of platinum and 0.159% of rhodium, by weight relative to the porous carrier.

EXAMPLE 7 (COMPARATIVE)

Preparation of a palladium-rhodium catalyst (VII) by co-impregnation

As in Example 3, a 904 ml Corning monolith is coated with a porous carrier comprising 105 g of alumina and 21 g of cerium oxide.

The coated monolith thus obtained is put into contact with 200 ml of a solution of palladium chloride and rhodium trichloride containing 1 g of palladium and 0.2 g of rhodium, for 30 minutes.

The impregnated monolith is placed in a stove at 120° C. for 3 hours then in an oven, in air. Its temperature is raised to 500° C. in 2 hours then kept at that level for 2 hours.

Catalyst (VII) thus prepared contains 0.794% of palladium and 0.159% of rhodium, by weight relative to the porous carrier.

EXAMPLE 8 (COMPARATIVE)

Preparation of a palladium-rhodium catalyst (VIII)

As in Example 3, a 904 ml Corning monolith is coated with a porous carrier comprising 105 g of alumina and 21 g of cerium oxide.

At a first stage the coated monolith thus obtained is put into contact with 200 ml of a solution of palladium chloride containing 1 g of palladium, for 30 minutes.

In a second stage the impregnated monolith is placed in a stove at 120° C. for 3 hours then in an oven, in air. Its temperature is raised to 500° C. in 2 hours then kept at that level for 2 hours. It is cooled to 25° C. in air.

In a third stage the monolith is impregnated with 200 ml of a rhodium chloride solution containing 0.2 g of rhodium.

In a fourth stage the monolith is dried in a stove at 120° C. for 2 hours then placed in an oven, in air. Here its temperature is raised to 500° C. in 2 hours, then it undergoes isothermal treatment at 500° C. for 2 hours.

Catalyst (VIII) thus prepared contains 0.794% of palladium and 0.159% of rhodium, by weight relative to the porous carrier.

EXAMPLE 9

Preparation of a palladium-rhodium catalyst (IX) according to the invention

As in Example 3, a 904 ml Corning monolith is coated with a porous carrier comprising 105 g of alumina and 21 g of cerium oxide.

At a first stage the coated monolith thus obtained is put into contact with 200 ml of a solution of palladium chloride containing 1 g of palladium, for 30 minutes.

At a second stage the impregnated monolith is placed in a stove at 120° C. for 3 hours. When this treatment is over the monolith is placed in air in an oven and undergoes a rise in temperature from 120° to 500° C. in 2 hours, after which it is kept at 500° C. for 2 hours. It is thereupon cooled to 40° C. The monolith is next scavenged with a reducing mixture containing 5% of hydrogen in nitrogen. Its temperature is then raised to 500° C. in this gas mixture in 2 hours, after which it is kept at that level for 2 hours. It is thereupon cooled to 25° C. in the same atmosphere, then the hydrogen-nitrogen mixture is replaced by pure nitrogen.

In a third stage the monolith is impregnated with 200 ml of a solution of rhodium chloride containing 0.2 g of rhodium, in nitrogen.

In a fourth stage the monolith is placed in a stove at 120° C. for 2 hours, then in an oven where its temperature is raised from 120° to 500° C. in 2 hours. It is kept at 500° C. for 2 hours.

Catalyst (IX) thus prepared contains 0.794% of palladium and 0.159% of rhodium, by weight relative to the porous carrier.

EXAMPLE 10

Activity of the catalysts in oxidation

Since the object of the method of the invention is to improve the stability of catalysts, this example compares the performance of catalysts I and II, prepared as described in Examples 1 and 2 respectively, after 15 hours' calcination treatment in air at 900° C.

A cylindrical sample 30 mm in diameter and 76 mm long is taken for each catalyst and placed in a laboratory catalytic testing unit comprising a gas mixture generator, a reaction zone and an apparatus for analysing the effluents discharged from the catalyst.

The gas mixture generator is made up of controllers of flow rate (by mass), for controlling the respective flow rate of nitrogen, oxygen, carbon dioxide, carbon monoxide and propane. In addition a pump injects a controlled flow rate of water, which is evaporated and mixed with the other gases. The composition of the gas mixture by volume is: 73.45% nitrogen, 10% carbon dioxide, 10% water vapour, 5% oxygen, 1.5% carbon monoxide and 0.05% propane. Such a mixture has a distinctly oxidising character, as is the case with exhaust fumes from weak engines (moteurs pauvres) or diesel engines.

The reaction zone is formed by a steel tube placed in an oven. The tube contains the catalyst, which is scavenged by the gas mixture prepared in the mixture generator previously described. The oven temperature is programmed to rise linearly from 150° to 600° C. at the rate of 5° C./minute. The temperature of the gases is measured 5 mm away from the entry surface of the catalyst.

The concentration of carbon monoxide at the outlet from the catalyst is measured continuously with an infra-red analyser. The concentration of propane is measured continuously with a flame ionisation detector. Carbon monoxide conversion is the ratio of the reduction in its concentration from one end of the catalyst to the other, to its concentration at the inlet to the catalyst. Propane conversion is calculated by the same formula applied to the concentrations of propane.

Integral conversion of a pollutant is the ratio, expressed as a percentage, of the integral of the curve representing conversion of the pollutant against the temperature from 200° to 550° C., to the integral which would result from total conversion within the temperature range in question. Table 1 below sets out the results obtained with catalysts I and II in eliminating carbon monoxide (CO) and propane ($C_3H_8$) from a gas mixture with an oxidising character.

TABLE 1

| Catalyst ref.no. | Integral conversion of CO (%) | Integral conversion of C3H8 (%) |
| --- | --- | --- |
| I | 65 | 51 |
| II | 77 | 63 |

It will be seen that catalyst II prepared according to the invention is a clear improvement on comparative catalyst I.

EXAMPLE 11

Activity of the catalysts in post-combustion

Catalysts III to IX, prepared as described in Examples 3 to 9 respectively, are post-combustion catalysts for exhaust fumes, containing cerium. They are therefore more particularly suitable for converting pollutants contained in exhaust fumes from internal combustion engines operating at a mean concentration of 1:1.

To test the improvement in stability associated with preparation by the method of the invention, catalysts III to IX are aged and tested on an engine test-bed. The test-bed has a four-cylinder 2200 cm3 engine. It runs at richness A, through electronic injection controlled by an indication of richness supplied by an oxygen probe located on the exhaust pipe. It operates with a fuel which complies with the Eurosuper specifications.

The catalysts are mounted in a metal case and arranged on the exhaust line. A system to control the temperature of the exhaust fumes from 150° to 600° C., used only in the catalystic testing phase, is installed between the exhaust head and the catalyst.

In the catalyst ageing phase the engine runs at 4000 revolutions per minute. The temperature of the exhaust fumes is then 850° C. Under these conditions an ageing time of 200 hours can simulate driving 80 000 km along roads under normal conditions.

In the catalytic testing phase the engine runs at 2500 revolutions per minute. The temperature of the exhaust fumes is gradually raised from 250° to 550° C. by the temperature control.

The concentration of carbon monoxide before and after the gases pass over the catalyst is determined by an infrared analyser.

The concentration of nitrogen oxide before and after the catalyst is determined by a chemiluminescence analyser.

The concentration of hydrocarbons before and after the catalyst is determined by a flame ionisation detector.

Integral conversion is measured at from 300° to 550° C.

Table 2 below sets out the results obtained in converting carbon monoxide (CO), hydrocarbons (HC) and nitrogen oxides ($NO_x$) with catalysts III to IX.

TABLE 2

| Catalyst ref.no. | Integral conversion of CO (%) | Integral conversion of C3H8 (%) | Integral conversion of NO (%) |
|---|---|---|---|
| III | 58 | 62 | 42 |
| IV | 67 | 71 | 49 |
| V | 69 | 70 | 50 |
| VI | 66 | 69 | 49 |
| VII | 51 | 52 | 40 |
| VIII | 53 | 52 | 38 |
| IX | 60 | 59 | 50 |

Catalysts IV, V, VI and IX prove to have a better performance after treatment under harsh conditions than comparative catalysts III, VII and VIII.

EXAMPLE 12

Characterisation of catalysts III and IV

Catalysts III and IV are characterised by a reduction at the programmed temperature in hydrogen and by analysis of the infra-red absorption spectrum after chemisorption of CO.

Reduction at the programmed temperature is effected by placing a sample of catalyst in a quartz cell. A stream of nitrogen containing 5% by volume of hydrogen flows through the cell. The cell is placed is an oven to raise the programmed temperature from room temperature to 800° C.

Consumption of hydrogen through reduction of the catalyst is determined by a catbarometer detector.

BRIEF DESCRIPTION OF THE DRAWINGS

(FIG. 2) as against one peak at 210° C. for the catalyst prepared by co-impregnation (FIG. 1).

Figure 1:
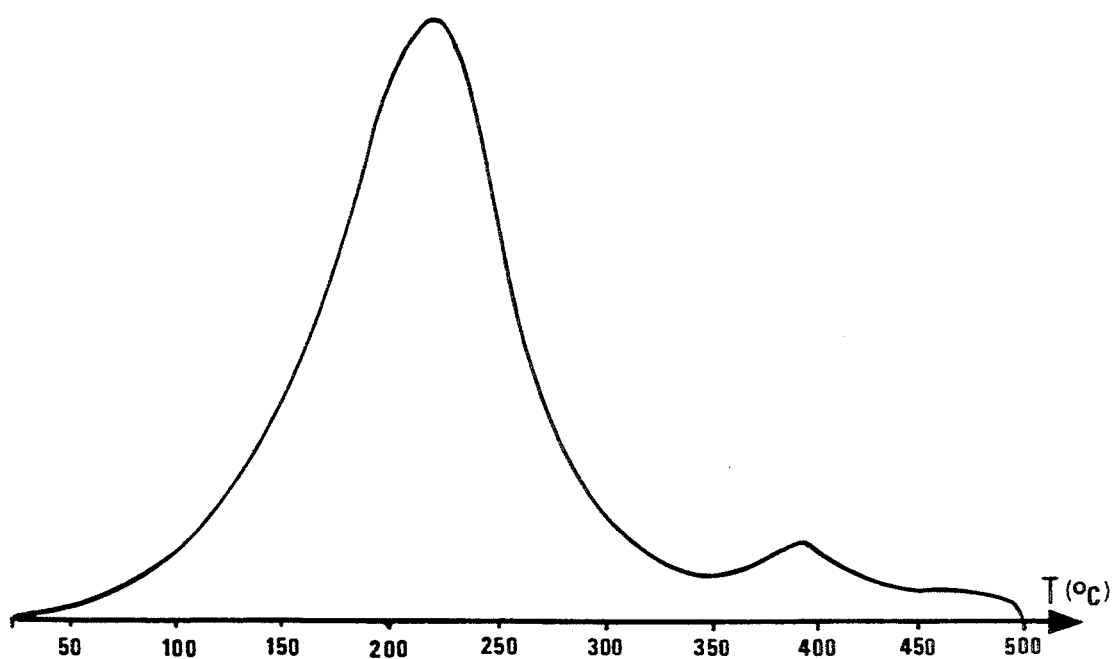
FIGS. 1 and 2 are curves showing the reduction of catalysts III and IV at the programmed temperature. The abscissa carries the temperatures and the ordinate a value representing the hydrogen conversion rate. They show that the catalyst prepared according to the invention is clearly distinguished from the comparative catalyst prepared by co-impregnation; tile reduction curve has two peaks at about 200° and 260° C.
Figure 2:
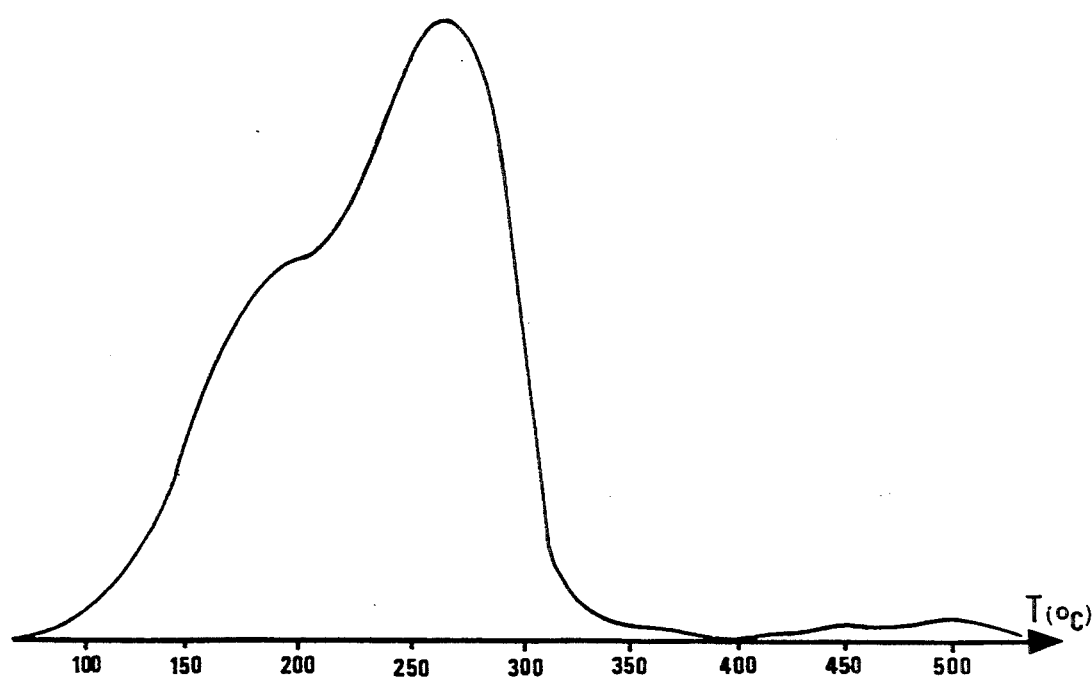

For infra-red analysis of chemisorption of CO, catalysts III and IV are pressed into pastille shapes 25 mm in diameter and weighing 15 mg. They are placed in a cell for treatment and analysis, which enables them to be treated in a control led atmosphere at temperatures ranging from room temperature to 600° C. They then undergo reduction in hydrogen to 500° C. whereupon, after being cooled to room temperature in helium, they are put under vacuum for 30 minutes. The infra-red absorption spectrum for catalysts III and IV is recorded with an infra-red spectrometer with a Fourier transform, forms tile reference spectrum. The catalysts then have CO adsorbed on them by letting in sufficient CO to bring the CO pressure in the cell to 20 mbar. When they have been put under vacuum for 20 minutes, the infra-red absorption spectrum of the catalysts which have chemisorbed CO is recorded.

FIG. 3 represents differences between the spectra of the catalysts after CO-chemisorption and the reference spectra before CO-chemisorption, with the purpose to show absorption bands due to CO-chemisorption. In abscissae are plotted the wave number in $cm^{-1}$ and in ordinates the absorbencies. Spectrum A corresponds to Catalyst III and Spectrum B to Catalyst IV. It clearly appears that the infra-red adsorption bands of CO are different according to the process carried out for the preparation of the catalysts.

We claim:

1. In a method of producing a multimetal catalyst in which the active phase comprises at least two metals, A and B, belonging to Groups VIII and IB of the Periodic Table, deposited on a porous carrier, the method comprising:

in a first stage, impregnating at least part of the porous carrier with at least one precursor of metal A;

in a second stage, activating a product of the first stage in a neutral or oxidizing atmosphere;

in a third stage, impregnating at least part of the carrier which is already at least partly impregnated with the precursor of metal A with at least one precursor of metal B; and in a fourth stage, activating a product of the third stage in a neutral or oxidizing atmosphere, the improvement comprising directly after the second stage activation in a neutral or oxidizing atmosphere, treating a product of the second stage in a reducing medium at 0° to 800° C.

2. The method of claim 1, wherein the reducing medium comprises at least one compound selected from: hydrogen, carbon monoxide, saturated or unsaturated, aliphatic or aromatic hydrocarbons, carboxylic acids, aldehydes, alcohols, polyols, amines and combustion gases from an air-hydrocarbon mixture at a concentration of air to hydrocarbon higher than 1:1.

3. The method of claim 1, wherein at the second stage, treatment in a reducing medium at 0°–800° C. is followed by treatment by hydrogen or at least one hydrogen donor compound at a temperature below 200° C.

4. The method of claim 3, wherein the hydrogen donor compound is selected from ammonia, saturated or unsaturated aliphatic hydrocarbons and aromatic hydrocarbons.

5. The method of claim 1, wherein the precursors of metals A and B are used in proportions such that the metals A and B are present in the catalyst, each at a concentration of from 10 ppm to 10%, by weight relative to the porous carrier.

6. The method of claim 1, wherein the porous carrier includes at least one alumina.

7. The method of claim 1, wherein the catalyst further comprises a substrate on which the carrier is deposited.

8. The method of claim 7, wherein the substrate is a ceramic or metallic monolith.

9. The method of claim 7, wherein the substrate is coated with the porous carrier before the metals A and B are deposited on the carrier.

10. The method of claim 7, wherein the substrate is coated with the porous carrier after the metals A and B are deposited on the carrier.

11. The method of claim 7, wherein the metal A is deposited on the porous carrier, then the substrate is coated with the porous carrier and the metal B is deposited on the porous carrier thus positioned.

12. A multi-metal catalyst comprising, in an active phase, at least one metal A and at least one metal B, each selected from Group VIII and IB of the Periodic Table, deposited on a porous carrier, wherein it is prepared by the method of claim 1.

13. The catalyst of claim 12, wherein each of the metals A and B is present at a concentration of from 10 ppm to 10%, by weight relative to the porous carrier.

14. The catalyst of claim 13, wherein said concentration is from 50 ppm to 2%.

15. The catalyst of claim 12, wherein the metal A is selected from platinum and palladium, and that the metal B is different from the metal A and is selected from platinum, palladium and rhodium.

16. The catalyst of claim 15, where the metal A is platinum and the metal B rhodium, wherein the graph showing reduction at a programmed temperature in hydrogen has two maxima at approximately 200° and 260° C., and the infra-red spectrum after adsorption of carbon monoxide has a band at approximately 2084 cm$^{-1}$.

17. In a method of catalytically converting pollutants in exhaust fumes from internal combustion engines to non-noxious molecules, the improvement comprising employing as said catalyst a catalyst according to claim 12.

18. A multi-metal catalyst comprising, in an active phase, at least one metal A and at least one metal B, each selected from Groups VIII and IB of the Periodic Table, deposited on a porous carrier, where the metal A is platinum and the metal B rhodium, wherein the graph showing reduction at a programmed temperature in hydrogen has two maxima at approximately 200° C. and 260° C., and the infrared spectrum after adsorption of carbon monoxide has a band at approximately 2084 cm$^{-1}$.

19. In a method of catalytically converting pollutants in exhaust fumes from internal combustion engines to non-noxious molecules, the improvement comprising employing as said catalyst a catalyst according to claim 18.

20. A process according to claim 1, wherein the second stage is conducted at 120° to 800° C., the treatment in a reducing medium is conducted at 0°–100° C. and the fourth stage is conducted at 120° to 800° C.

21. A process according to claim 2, wherein the reducing agent is methane, ethane, propane, butane, ethylene, propylene, acetylene, benzene, toulene, formic acid, acetic acid, formaldehyde, acetaldehyde, methanol, ethanol, propanol, ethylene glycol, propylene glycol, methylamine, ethylamine, urea, isocyanic acid, hydroxylamine, or hydrazine.

* * * * *